350-358
8/17/82 OR 4,344,675 SR

United States Patent [19]

Yao

[11] 4,344,675

[45] Aug. 17, 1982

[54] OPTICAL SIGNAL PROCESSING DEVICE

[75] Inventor: Shi-Kay Yao, Anaheim, Calif.

[73] Assignee: Rockwell International Corporation, El Segundo, Calif.

[21] Appl. No.: 154,358

[22] Filed: May 29, 1980

[51] Int. Cl.$^3$ .......... G02F 1/11

[52] U.S. Cl. .......... 350/358

[58] Field of Search .......... 350/358, 96.13

[56] References Cited

U.S. PATENT DOCUMENTS 3,483,387 12/1969 Davis, Jr. .......... 350/358

3,539,245 11/1970 Brienza .......... 350/358

*Primary Examiner*—William L. Sikes

*Attorney, Agent, or Firm*—H. Fredrick Hamann; Daniel R. McGlynn

[57] ABSTRACT

An optical system including a radio frequency signal input; a chirp signal input; a source for emitting a beam of radiation; a first acousto-optical modulator disposed in the path of the beam and functioning to modulate the beam with the radio frequency signal to produce a first modulated beam; a second acousto-optical modulator disposed in the path of the first modulated beam to modulate the beam with the chirp signal to produce a third modulated beam; and a single detector disposed in the path of the third modulated beam.

7 Claims, 2 Drawing Figures

OPTICAL SIGNAL PROCESSING DEVICE

CROSS REFERENCE TO RELATED APPLICATIONS

This application is related to the concurrently filed and copending U.S. patent applications Ser. Nos. 154,359 and 154,246, assigned to the assignee of the present application.

BACKGROUND OF THE INVENTION

1. Field of the Invention

The invention relates to optical systems, and more particularly to an arrangement of optical elements for performing optical signal processing.

2. Description of Prior Art

The use of optical elements for simple, coherent optical signal processing is well known in the art. Processing functions such as matrix multiplication, Fourier transform, and convolutions can be performed using coherent optical processing. Such systems have been constructed from bulk three dimensional elements such as lenses, bulk modulators, and two dimensional detector arrays. Another important application is the spectral analysis of RF signals.

An optical RF spectrum analyzer described in the prior art employs the interaction between a coherent optical wave and an acoustic wave driven by an input electrical signal to determine the power spectral density of the input. Such an analyzer may be implemented in an integrated optics version, and is described in the article Integrated Optic Spectrum Analyzer, M. K. Barnowski, B. Chen, T. R. Joseph, J. Y. Lee, and O. G. Rama, IEEE Trans. on Circuits and Systems, Vol. CAS-26, No. 12, Dec. 1979. The integrated optics version consists of an injection laser diode, a thin-film optical waveguide, waveguide lens, a surface acoustic wave transducer, and a linear detector array.

The unit operates by mixing an incoming radar signal with a local oscillator such that the intermediate frequency is within the pass band of the transducer. After amplification, the signal is applied to the SAW transducer. The resulting surface acoustic waves traversing the optical waveguide generate a periodic modulation of the refractive index of the waveguide mode. If the culminated optical beam intersects the acoustic beam at the Bragg angle, a portion of the beam will be defracted or deflected at an angle closely proportional to the acoustic frequency with intensity proportional to the power level of the input signal. The Bragg detector light is then focused on an array of focal plane detectors where each detector output becomes one frequency channel of the spectrum analyzer. Such systems are limited to obtaining the intensity of the Fourier transform which is useful for determining the intensity of the incoming signal. However, the Fourier transformer alone and the knowledge of the intensity is insufficient to determine the amplitude of the individual frequency components.

SUMMARY OF THE INVENTION

Briefly, and in general terms, the invention provides an optical system including a radio frequency signal input; a chirp signal input; a source for emitting a beam of radiation; a first acousto-optical modulator disposed in the path of the beam and functioning to modulate the beam with the radio frequency signal to produce a first modulated beam; a second acousto-optical modulator disposed in the path of the first modulated beam and functioning to modulate the beam with the chirp signal to produce a second modulated beam. The invention further provides an acousto-optical filter disposed in the path of the second modulated beam and functioning to modulate said beam with said filter signal to produce a third modulated beam; a lens disposed in the path of the third modulated beam for collimating the third modulted beam to produce a fourth collimated modulated beam; and a detector disposed in the path of the fourth modulated beam.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENT

It is well known that filters can be made easily in a coherent optical spatial filtering system but not in real time. Thus, the adaptive programmable filter applications today rely on the relatively slow digital computers and the surface acoustic wave programmable delay line. Here, an all acousto-optical technique is disclosed for such application.

Turning to the figures there is shown an acousto-optical system in which the Fourier transform of input signal travels at the speed of sound together with the acoustic filter signal. The filtered response may be an inverse Fourier transform to produce either a stationary signal for viewing (shown in FIG. 1) or a traveling signal for self-scanned read-out (shown in FIG. 2). The implementation of the filter utilizes a modulator which functions as an optical gate of the acoustic wave front for the acousto-optical filter. Ideal filter functions can be generated in real time at delays of microseconds to nanoseconds.

Figure 1:
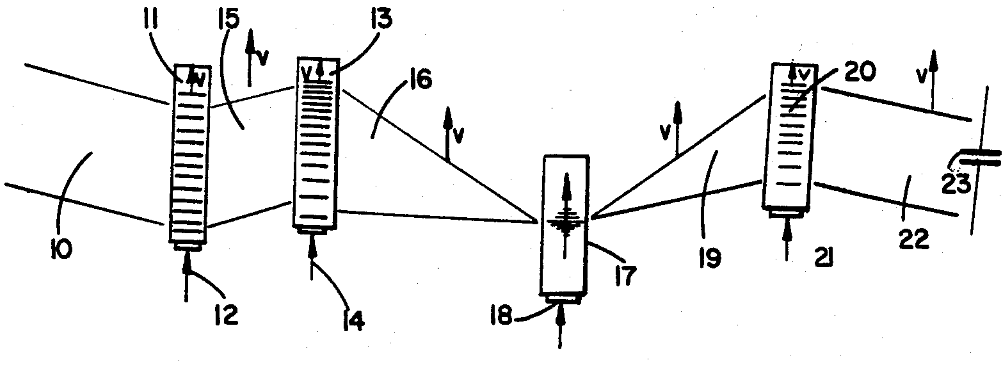
FIG. 1 is a view of a simplified version of the optical elements used in the optical signal processing device according to the present invention.

Turning first to FIG. 1 there is shown a diagramatic arrangement of the optical system according to the present invention. On the left hand of the figure is a laser beam which interfaces with a spatial modulator 11. The spatial modulator 11 converts an RF signal applied at the input 12 to modulate the coherent input beam to a modulated wavefront beam 15. The modulated beam 15 is then applied to an acousto-optical lens 13 which is well known in the art. The input 14 of the acousto-optical lens 13 is driven by a chirp signal. The chirp signal is frequency modulated nearly linearly and with constant amplitude. The function of the acousto-optical lens is to focus the beam 15 into a focused beam 16 which converges at a focal point at which is placed a programmable acousto-optical filter 17. Since the signal on the acousto-optical lens travels at the speed of sound in the solid medium, the optical beam 16 travels at the same speed v in a direction normal to the direction of optical propagation. This therefore creates a scanning effect of the beam on the surface of the programmable acousto-optical filter 17. The amplitude of the optical signal at the focal plane of the programmable acousto-optical filter 17 is related to the original input RF signal 12 as a Fourier transform thereof. A filter signal 18 is applied to the programmable acousto-optical filter 17. The filter signal 18 then travels in the filter 17 at the same speed of sound v at which the wavefront 16 is scanning the filter, so that the two signals are synchronized with respect to one another. The function of the programmable acousto-optical filter is to combine the Fourier transform signal F 16 with the filter signal G supplied at the input 18 and to form a complex product of the two signals FG. The complex product of the two signals varies in phase and amplitude from either of the two original signals. The product signal 19 is then focused on another acousto-optical lens 20 which has as its input a similar chirp input 21 which is driven in synchronization with the chirp input 14. The effect of the acousto-optical lens 20 is to collimate the product beam 19 into an array of parallel beams 22. Since the signal 22 is beam scanned or traveling in a direction normal to the optical propagation path at a speed v, it is necessary to have a single detector placed in the direction of propagation of the beams 22 to detect a single beam. Although multiple detectors can be used, a single detector is preferred because of its simplicity. The output of the detector 23 is the filtered signal of the input signal applied at the input 12.

Figure 2:
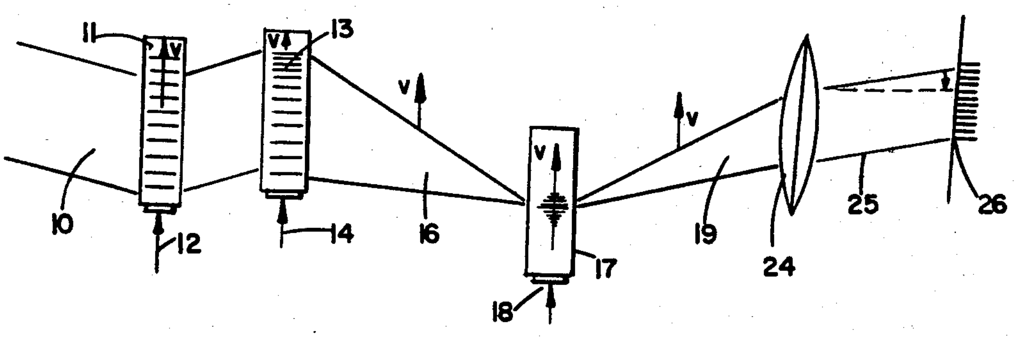
FIG. 2 is another embodiment of the optical signal processing device according to the present invention.

In FIG. 2 the acousto-optical lens 20 has been replaced by a fixed optic lens 24 which converts the product beams 19 into collimated beams which fluctuate in space but do not travel with a velocity v normal to the direction of propagation. For this reason it is necessary to use a photodetector array 26 at the focal plane of the lens 24 in order to detect the information contained in the signals from the beams 25.

While the invention has been illustrated and described as embodied in an optical signal processing system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitutes essential characteristics of the generic or specific aspects of this invention, and, therefore, such adaptations should and are intended to be comprehended within the meaning and range of equivalence of the following claims.

What is claimed is:

1. An optical system comprising:

input means for providing a radio frequency input signal;

chirp means for providing a substantially linearly frequency modulated chirp signal of constant amplitude;

a source for emitting a beam of radiation;

first acousto-optical modulation means disposed in the path of said beam, and connected to said input means and driven by said input signal, said first acousto-optical modulation means functioning to modulate said beam with said radio frequency input signal to produce a first modulated beam;

second acousto-optical modulation means disposed in the path of said first modulated beam, and connected to said chirp means and driven by said chirp signal, said acousto-optical modulation means functioning to modulate said beam with said chirp signal to produce a second modulated beam;

means for providing a filter signal representing a predetermined filter function to be applied to said input signal;

acousto-optical filter means disposed in the path of said second modulated beam and functioning to modulate said beam with said filter signal to produce a third modulated beam;

lens means disposed in the path of said third modulated beam for collimating the third modulated beam to produce a fourth collimated modulated beam; and detector means disposed in the path of said fourth modulated beam for detecting the optical intensity distribution at the focal point thereof.

2. An optical system as defined in claim 1, wherein said lens means is an acousto-optical lens.

3. An optical system as defined in claim 1, wherein said lens means is a fixed optical lens.

4. An optical system as defined in claim 1, wherein said source for emitting a beam of radiation is a laser.

5. An optical system as defined in claim 1, wherein said detector means comprises a single detector.

6. An optical system as defined in claim 1, wherein said detector means comprises a detector array in the path of said beam at the focal plane of said lens.

7. An optical system as defined in claim 1, wherein said acousto-optical filter means is driven in synchronization with the chirp signal.

* * * * *